Patented Nov. 17, 1953

2,659,656

UNITED STATES PATENT OFFICE 2,659,656

PROCESS FOR THE RECOVERY OF POTASSIUM FROM SEA WATER AND SALINE AQUEOUS SOLUTIONS

Endre Qvie Berner, Slemdal, near Oslo, and Jacob Kielland, Heroya, near Porsgrunn, Norway, assignors, by mesne assignments, to A/S Norduco, Oslo, Norway, a corporation of Norway No Drawing. Application June 14, 1951,
Serial No. 231,666
In Norway February 13, 1940

Section 1, Public Law 690, August 8, 1946
Patent expires February 13, 1960

11 Claims. (Cl. 23—38)

The present application is a continuation-in-part of U. S. application Serial No. 783,212, filed October 30, 1947, now abandoned.

The invention relates to a novel method for the recovery of potassium salts in the form of insoluble precipitates with pentanitro diphenylamines and unsymmetrical hexanitro diphenylamines used as precipitating agents for the potassium salts in the presence of interfering alkali metal salts and/or alkaline earth salts as well as other salts present in salt brines, sea water and other aqueous salt solutions. The so-precipitated insoluble potassium aminate obtained in the inventive process herein, is seperated from the impure salt solution being treated, and is thereafter converted by treatment with acid to form a soluble potassium salt of the acid in the resulting solution, and to regenerate the unsymmetrical hexanitro diphenylamine and pentanitro diphenylamine precipitating reagent. This latter amine precipitant is available for further cycling in the precipitation step of the process, subject only to small handling losses, and the pure potassium salt is readily recovered from the aqueous solution. Any surplus reagent remaining in the impure salt solution from which was separated the precipitated potassium aminate, is also recovered, for instance by acidulation, separated and recycled in the process.

In the research and development work leading to the present invention, it was recognized as necessary for the technical realization of a process for the recovery of potassium from sea water and salt brines, that organic precipitating materials be discovered, which would exhibit a high solubility in water for the calcium, sodium and magnesium salts thereof, and which would exhibit a low solubility for the potassium salts thereof. Further, the organic precipitating agent was required to have a low solubility of the acid thereof in slightly acid water, in order to facilitate the practically complete recovery of this relatively expensive precipitating agent to allow its reuse in a cyclic process, and to permit the economical realization of the plant process.

Practically no information of useful value was available in the prior art to ascertain the solubility of the above indicated inorganic salts of relatively weak inorganic acids in water solutions of varying acidity in order to attain the object of the invention. The inventors' investigations confirmed the observation of Dr. Joel H. Hildebrand "Solubility of Nonelectrolytes," Reinhold Publishing Co., New York, 1936, at pages 14–15, where it was stated that the problem of determining the escaping tendency of the various components of a solution, which depends upon the solution composition and the nature of the components is beset with such difficulties, that it has not been possible to successfully predict these phenomena. "The average chemist is acquainted with but a few rules for his guidance beyond the simple maxim that 'like dissolves like' which is limited in usefulness by uncertainty regarding the criteria for likeness."

From the research work done on nitrophenols, tetranitro diphenylamines, and nitrobenzene azo salicyclic acids, as recounted below, it was surprising indeed that the class of pentanitro diphenylamines and unsymmetrical hexanitro diphenylamines supplied the successfully operative precipitants for potassium within the rigorous specification required for the solubilities of their potassium salt, free amine at low pH and calcium salt.

The investigation of nitrated organic acids of the phenol type showed in the case of 2,4,6 trinitrophenol at room temperature a solubility of 4 grams per liter for the potassium salt, 450 grams per liter of the calcium salt and 12,000 milligrams per liter for the free acid (pH 2–4) which clearly eliminated this compound as a precipitant in the process.

Substitution of other groups than nitro with nitrated phenols was likewise unsuccessful; with 2,4 dinitro 3 methyl 6 isopropyl phenol the potassium salt solubility at room temperature measured 7.6 grams per liter, the corresponding calcium salt 24 grams per liter and the free acid (pH 2–4) at 1900 milligrams per liter; under the same conditions with 2 nitro 4,5,6 tribromophenol even worse results were obtained, the room temperature solubilities of the potassium salt measured 16 grams per liter, and the free acid (pH 2–4) between 0.1 to 1 milligram per liter.

Investigation of the azobenzene salicyclic acids was likewise unsuccessful in obtaining the object of the invention; even though the potassium salts appeared to have a desirable low solubility, the unfavorable low solubility of the calcium salts precluded the application of these materials to obtain the inventive result desired.

Thus 3 nitrobenzene azo salicyclic acid exhibits a potassium salt solubility at room temperature of 0.12 gram per liter and a calcium salt solubility under the same conditions of 0.25 gram per liter; 4 ethoxy benzene azo salicyclic acid exhibits a potassium salt solubility at room temperature of 7.3 grams per liter and a calcium salt solubility of 0.08 gram per liter; 4 methoxy benzene azo 3 bromo salicyclic acid exhibits a solubility of 0.05 gram per liter of the potassium salt and 0.07 gram per liter of the calcium salt at room temperature.

In the inventors' U. S. Patent 2,258,381, dated October 7, 1941, use has been made of the fact that dipicrylamine, i. e. symmetrical 2,4,6,-2',4',6' hexanitro diphenylamine, provides a readily soluble calcium salt, and an insoluble potassium salt which permits its application for the recovery of potassium from sea water and salt brines. However, certain difficulties in the handling of the 2,4,6,-2',4',6' hexanitro diphenylamine owing to its toxic properties led to the continued search for other suitable reagents conforming to the stringent requirements covering the acid, potassium and calcium salt solubilities, and necessary in the technical process of the invention.

An object of the invention is the utilization of additional and suitably effective precipitants for potassium in the extraction of sea water and salt brines, to obtain improvements in the potassium precipitation process and the regeneration of the precipitant to minimize loss in handling.

A further object of the invention is the utilization of unsymmetrical hexanitro diphenylamines and pentanitro diphenylamines to obtain improvements in the potassium precipitation process, regeneration of the amine precipitant to minimize mechanical losses, and to improve the purity of recovered potassium in batch and continuous operation.

A further object of the invention is the utilization of unsymmetrical hexanitro diphenylamines and substituted pentanitro diphenylamines which are substituted with alkyl, halogen, alkoxy and acid groups to reduce the nitric acid requirement for a given precipitating amount of the amine and to provide enhanced reduced solubility of both potassium salt and free amine in acid solution, at the same time improving the potassium precipitation process and the regeneration of the free amine to provide potassium solutions of improved purity.

The inventors' experiments have shown that the tetranitro diphenylamines are insufficiently acid to form potassium salts, and have further demonstrated that the collective properties of low potassium salt solubility, low amine solubility and high calcium and magnesium salt solubility cannot be predetermined on the basis of the degree of nitration alone. Rather, these properties depend upon the structural nature of the starting material nitrated, and no general relationship has been discovered to lead to a predetermination of the order of solubility obtained when the ring position of the substituents, nitro, alkyl, carboxy, and alkoxy groups, halogen etc. are changed.

It was, therefore, quite surprising that the unsymmetrical hexanitro diphenylamines and pentanitro diphenylamines as a class not only possessed low solubilities for their potassium salts, but also possessed high solubilities for their sodium, magnesium and calcium salts while at the same time being sufficiently insoluble in the free amine state at a pH of 2-4 to permit ready recovery by acidulation.

It was surprising that substitution of hexanitro diphenylamine, and of pentanitro diphenylamine provided materials that satisfied the very stringent requirements of the potassium precipitating agent to permit its economical regeneration in a plant process.

Unsymmetrical substitution of the nitrated diphenyl nucleus with alkyl, alkoxy, halogen, and carboxy groups provided additional successful precipitants in the novel process, which compounds formed calcium salts with solubilities of the order of magnitude of 50 to 100 grams per liter.

Typical of these are 2,4,6,2',4',6' hexanitro 3 chloro diphenylamine whose potassium salt exhibited a room temperature solubility of 0.95 gram per liter, the free acid (pH 2-4) less than 1 milligram per liter; and 2,4,6,2',3',6' hexanitro 4' methyl diphenylamine, potassium salt solubility 0.57 gram per liter and free acid (pH 2-4) solubility less than 1 milligram per liter (room temperature).

The substituted and unsubstituted pentanitro diphenylamines provided successful as precipitants in the novel extraction process, and provided calcium salts with solubilities of the order of magnitude of 50 to 100 grams per liter.

Typical pentanitro diphenylamines studied by us are:

2,4,6,3',6' pentanitro diphenylamine,
2,4,6,3',6' pentanitro 4' methyl diphenylamine,
2,4,2',4',6' pentanitro diphenylamine,
2,4,6,2',4' pentanitro 6' methyl diphenylamine,
2,4,6,2',4' pentanitro 5' chloro diphenylamine,
2,4,6,2',4' pentanitro 6' chloro diphenylamine,
2,4,6,2',4' pentanitro 6' methoxy diphenylamine,
2,4,2',4',6' pentanitro 5,6 dimethyl diphenylamine,
2,4,2',4',6' pentanitro 3',6 dimethyl diphenylamine,
2,4,2',4',6' pentanitro 3,6 dimethyl diphenylamine,
2,4,6,2',4' pentanitro 3' chloro 6' methyl diphenylamine,
2,4,6,2',4' pentanitro 3 methyl 5' carbonic acid diphenylamine,
2,4,6,2',6' pentanitro 4' chloro diphenylamine,
2,4,6,2',6' pentanitro 4' methyl diphenylamine,
2,6,2',4',6' pentanitro 3',4 dimethyl diphenylamine,
2,6,2',4',6' pentanitro 4 ethoxy diphenylamine.

Extremely low potassium solubilities and free acid solubilities were found for the pentanitro compounds as follows:

| Compound | Solubility at room temperature | |
|---|---|---|
| | K salt, grams/liter | acid, milligrams/liter |
| 2,4,2',4',6' pentanitro diphenylamine | 0.48 | 1 |
| 2,4,6,2',4' pentanitro 6'methyl diphenylamine | 0.15 | 1 |
| 2,4,6,2',4' pentanitro 6'chloro diphenylamine | 0.22 | 1 |
| 2,4,6,2',4' pentanitro 6'methoxy dephenylamine | 0.2 | 1 |
| 2,4,6,2',4' pentanitro 3 methyl 5'carbonic acid diphenylamine | 0.19 | 1 |
| 2,4,6,2',4' pentanitro 3'chloro 6'methyl diphenylamine | 0.50 | 1 |
| 2,6,2',4',6' pentanitro 3',4 demethyl diphenylamine | 0.43 | 1 |

In addition to the mentioned substituted hexanitro diphenylamines we may also quote the excellent solubility data found for unsymmetrical 2,3,4,2',4',6' hexanitro diphenylamine: its potassium salt 0.40 gram/liter; the acid less than 1 milligram/liter.

The process may be carried out by adding stoichiometric quantities or slightly less, of the unsymmetrical hexanitro diphenylamine or pentanitro diphenylamine precipitating agent, relative to the potassium content being treated, together with a corresponding amount or slightly more, relative to the amine, of a milk of lime solution to the salt brine or sea water, thereby precipitating insoluble potassium aminate.

The lime is added at a suitable rate in order to regulate the pH, as is understood, thus influencing the rate of dissolution of the amine and the rate of crystallisation of the potassium aminate, so as to improve the quality of the potassium filter cake.

Further, instead of the formation of calcium diaminate in the precipitation of the insoluble potassium aminate, use may also be made of the sodium, or magnesium salt, but the calcium salt is preferred.

The process may be carried out by adding lime, or milk of lime, and solid amine to the saline solution, or by forming a solution of the calcium salt, beforehand, by adding the lime to the amine, and adding the resulting solution to the saline solution.

After separating and washing the potassium aminate filter cake, it is treated with an acid, viz. an inorganic acid such as nitric acid, sulfuric acid, hydrochloric acid, or an organic acid such as acetic acid, carbonic acid, carbon dioxide under pressure whereby the soluble potassium salt of the treating acid is formed. By treatment with acid the free amine is precipitated from the mother liquor after the above mentioned separation of the potassium aminate, to regenerate also this part of the solid treating agent.

The regenerated solid amine obtained after acidification and decomposition is filtered, washed, and reused in a cyclic process.

A recovery of more than 80% of the potassium content of sea water is easily obtained by the present process, as well as more than 90% in the case of brines, with only negligible losses of the regenerated precipitant.

Having thus disclosed the invention, what we claim is:

1. A process for the recovery of a potassium salt from sea water and aqueous saline solutions containing dissolved potassium salts, comprising the steps of adding a water soluble salt of an unsymmetrically highly nitrated secondary aromatic amine selected from the group consisting of 2,4,6,2',4',6' hexanitro 3 halo diphenylamine, 2,4,6,3',6' pentanitro diphenylamine, 2,4,2',4',6' pentanitro diphenylamine, alkyl-substituted pentanitro diphenylamine, halogen-substituted pentanitro diphenylamine, alkoxy-substituted pentanitro diphenylamine and carboxy-substituted pentanitro diphenylamine, to the saline solution to precipitate the potassium as a sparingly soluble salt of said highly nitrated secondary aromatic amine, separating the precipitate from the mother liquor, reacting the separated potassium salt precipitate with an acid to liberate the potassium salt of said acid in solution and recovering the highly nitrated secondary aromatic amine.

2. A cyclic process as in claim 1 wherein mineral acid is added to the said mother liquor to precipitate and recover the amount of said amine contained in it, and which recovered amine is then recycled together with the main part of the recovered amine for the treatment of untreated saline liquor containing dissolved potassium salts.

3. A process as in claim 1, in which the pentanitro diphenylamine is an alkyl-substituted pentanitro diphenylamine.

4. A process as in claim 1, wherein the pentanitro diphenylamine is 2,4,6,2',4' pentanitro 6' methyl diphenylamine.

5. A process as in claim 1 wherein the pentanitro diphenylamine is 2,4,2',4',6' pentanitro diphenylamine.

6. A process as in claim 1, in which the pentanitro diphenylamine is a halogen-substituted pentanitro diphenylamine.

7. A process as in claim 1 wherein the pentanitro diphenylamine is 2,4,6,2',4' pentanitro 6' chloro diphenylamine.

8. A process as in claim 1, in which the pentanitro diphenylamine is an alkoxy-substituted pentanitro diphenylamine.

9. A process as in claim 1 wherein the pentanitro diphenylamine is 2,4,6,2',4' pentanitro 6' methoxy diphenylamine.

10. A process as in claim 1, in which the pentanitro diphenylamine is a carboxy-substituted pentanitro diphenylamine.

11. A process as in claim 1 wherein the pentanitro diphenylamine is 2,4,6,2',4' pentanitro 3 methyl 5' carbonic acid diphenylamine.

ENDRE QVIE BERNER.
JACOB KIELLAND.

References Cited in the file of this patent
UNITED STATES PATENTS

| Number | Name | Date |
|---|---|---|
| 2,258,381 | Fleischer et al. | Oct. 7, 1941 |